(No Model.)

A. J. J. LINDNER & M. ADLER.
TIRE FOR CYCLE OR OTHER WHEELS.

No. 516,313. Patented Mar. 13, 1894.

Witnesses
A. E. Melhuish

Inventors
A. J. J. Lindner
M. Adler
by their Attorney R. Haddan

THE NATIONAL LITHOGRAPHING COMPANY,
WASHINGTON, D. C.

United States Patent Office.

ALOŸSIUS JOSEPHUS JOHANNES LINDNER AND MAURICE ADLER, OF AMSTERDAM, NETHERLANDS.

TIRE FOR CYCLE OR OTHER WHEELS.

SPECIFICATION forming part of Letters Patent No. 516,313, dated March 13, 1894.

Application filed December 21, 1893. Serial No. 494,362. (No model.)

*To all whom it may concern:*

Be it known that we, ALOŸSIUS JOSEPHUS JOHANNES LINDNER and MAURICE ADLER, subjects of the Queen of the Netherlands, and residents of Amsterdam, in the Kingdom of the Netherlands, have invented a certain new and useful Improvement in Tires and Rims for Cycles or other Vehicles, of which the following is a specification.

This invention relates to tires for cycles and other vehicles and consists in the improvements, constituting the tire hereinafter described, to which we have given the name "arrektor."

Figure 1:
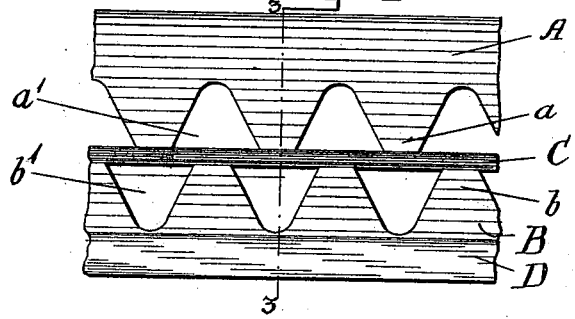
Figure 2:
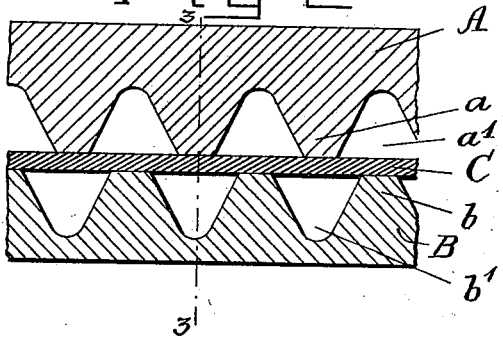
Figure 3:
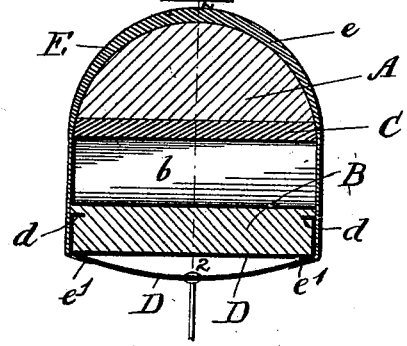
Figure 4:
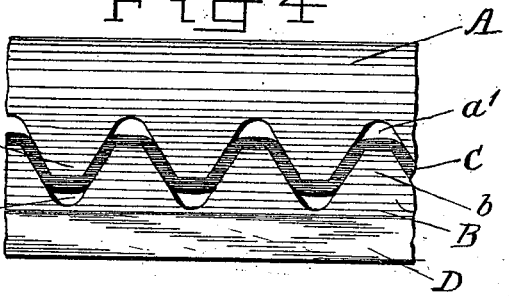

Reference being made to the annexed drawings, Figure 1 is a side elevation of the tire, or a portion thereof, with exterior envelope removed showing the tire attached to the rim. Fig. 2 is a longitudinal section on line 2, 2, Fig. 3. Fig. 3 is a cross section through the tire, rim, and envelope on line 3, 3, Figs. 1 and 2. Fig. 4 is a side elevation of the tire, when under compression, the exterior envelope being removed.

The tire consists of three parts or layers, an inner layer of cork, as a preferable material, B, having its outer surface serrated or corrugated so as to form alternately raised ridges $b$ and hollows $b'$; a middle layer C consisting of a flat band of gutta percha or equivalent rubber composition; and an outer layer A, preferably of cork having its inner surface serrated or corrugated so as to form alternate ridges $a$ and hollows $a'$. These three parts are assembled as shown in Fig. 1 so that the ridges $a$ are above the hollows $b'$ and the ridges $b$ under the hollows $a'$. The inner layer B is secured to the rim and by preference we use a hollow rim D with a flat bed surface for the tire and turned up edges bent inward at $d$ to secure the tire to the rim. The faces of the ridges $a$ and $b$ are connected to the band C, by cement.

This tire, we inclose in an envelope E which may be of usual construction being made thicker at the sole $e$ and attached on the rim for instance at $e'$ by cement, or any of the known methods of fastening such envelopes.

When this tire is compressed by contact with the ground the layers A and B are pressed together and with the band C assume the position shown in Fig. 4. When the pressure ceases the parts return to their original position as in Fig. 1 owing to the elasticity of the band C.

The resiliency of this tire and its suitability for different vehicles, road surfaces, or weight of load, may be varied by varying the thickness of the band C, by varying the tension of this band which may be put on loosely or under tension, by altering the pitch or distance from center to center of the teeth and making them broader or finer, or lastly by making the teeth higher or lower.

Having now particularly described and ascertained the nature of this said invention and in what manner the same is to be performed, we declare that what we claim is—

1. In a tire for cycles or other vehicles the combination of an inner layer B serrated on its outer surface, a resilient middle layer C and an outer layer A serrated on its inner surface, the serrations of the layer A being alternated with regard to those of the layer B substantially as and for the purpose set forth.

2. In a tire for cycles or other vehicles, the combination of an inner layer B serrated on its outer surface, a resilient middle layer C cemented to the summits of the said serrations and an outer layer A serrated on its inner surface and having the said serrations cemented to the middle layer C in positions intermediate between the serrations of the layer B substantially as and for the purpose set forth.

3. In a tire for cycles or other vehicles the combination of a layer B transversely serrated on its outer face, an intermediate resilient and in normal position flat layer C and an outer layer A transversely serrated on its inner face, the latter serrations being alternated with the former substantially as and for the purpose set forth.

4. In a tire for cycles or other vehicles the combination of an inner layer B having on its outer face transverse ridges $b$ and transverse recesses $b'$ between said ridges, the latter being wider at the mouth than the outer faces of the ridges; an intermediate resilient band C in contact with the outer faces of the ridges; and an outer layer A having on its inner face transverse ridges $a$ and transverse recesses $a'$ between said ridges, the faces of the ridges $a$ being in contact with the outer face of band C at surfaces opposite the recesses $b'$, substantially as and for the purpose set forth.

5. In a tire for cycles or other vehicles the combination of a serrated inner layer B, a resilient middle layer C and a serrated outer layer A arranged as set forth, with an inclosing envelope E, the whole substantially as and for the purpose set forth.

6. In a cycle or other vehicle the combination of a hollow wheel rim D with inturned edges $d$; with a tire composed of serrated inner layer B, resilient middle layer C and serrated outer layer A arranged substantially as set forth; and an exterior envelope E, the whole for the purpose described.

In witness whereof we have signed this specification in presence of two witnesses.

ALOŸSIUS JOSEPHUS JOHANNES LINDNER.
MAURICE ADLER.

Witnesses:
    FRANCISCUS SCHADOEN,
    AUGUST SIEGFRIED DOCEN.